(12) United States Patent
Fahldieck et al.

(10) Patent No.: US 10,189,653 B2
(45) Date of Patent: Jan. 29, 2019

(54) DEVICE FOR TRANSPORTING CONTAINERS, SUCH AS BEVERAGE BOTTLES

(71) Applicants: Andreas Fahldieck, Idar-Oberstein (DE); Nils Mallitzki, Simmern (DE)

(72) Inventors: Andreas Fahldieck, Idar-Oberstein (DE); Nils Mallitzki, Simmern (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/604,081

(22) Filed: May 24, 2017

(65) Prior Publication Data

US 2017/0327323 A1 Nov. 16, 2017

Related U.S. Application Data

(63) Continuation-in-part of application No. PCT/EP2015/075045, filed on Oct. 28, 2015.

(30) Foreign Application Priority Data

Nov. 26, 2014 (DE) .......................... 10 2014 117 358

(51) Int. Cl.
*B65G 47/34* (2006.01)
*B65G 47/86* (2006.01)
(Continued)

(52) U.S. Cl.
CPC ............ *B65G 47/847* (2013.01); *B65G 47/34* (2013.01); *B67C 3/242* (2013.01); *B65G 17/32* (2013.01)

(58) Field of Classification Search
CPC ............ B65G 17/32; B65G 2201/0235; B65G 19/02; B65G 19/025; B65G 29/00
(Continued)

(56) References Cited

U.S. PATENT DOCUMENTS 4,055,943 A * 11/1977 Reichert ............... B65B 21/183
  294/116
4,059,188 A * 11/1977 McDonald .......... B29C 49/4205
  198/464.4
(Continued)

FOREIGN PATENT DOCUMENTS

DE 297 13 510 U1 8/1998
DE 10 2005 014 838 10/2006
(Continued)

*Primary Examiner* — James R Bidwell
(74) *Attorney, Agent, or Firm* — Nils H. Ljungman & Associates

(57) ABSTRACT

A device for transporting containers. The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

16 Claims, 9 Drawing Sheets

(51) Int. Cl.
*B67C 3/24* (2006.01)
*B65G 17/32* (2006.01)

(58) Field of Classification Search
USPC ..... 198/470.1, 468.2, 867.05, 867.07, 803.7, 198/803.9
See application file for complete search history.

(56) References Cited

U.S. PATENT DOCUMENTS

| | | | | |
|---|---|---|---|---|
| 4,169,621 | A * | 10/1979 | McGill | B65B 21/12 294/116 |
| 4,262,795 | A * | 4/1981 | Hecker | B65G 47/842 198/803.12 |
| 5,711,411 | A * | 1/1998 | Zurweller | B67C 3/242 198/379 |
| 5,893,700 | A * | 4/1999 | Kronseder | B08B 9/426 198/803.9 |
| 7,988,400 | B2 * | 8/2011 | Yuyama | B25J 15/0226 221/265 |
| 8,225,923 | B2 * | 7/2012 | Fahldieck | B65G 29/00 198/470.1 |
| 8,672,376 | B1 | 3/2014 | Wilson et al. | |
| 8,833,824 | B2 * | 9/2014 | Fahldieck | B65G 47/847 198/468.5 |

FOREIGN PATENT DOCUMENTS

| | | | |
|---|---|---|---|
| DE | 10 2008 055 616 | 5/2010 | |
| DE | 10 2012 011 367 | 12/2013 | |
| EP | 2 138 434 | 12/2009 | |
| EP | 2138434 | * 12/2009 | ............ B65G 47/84 |
| EP | 2 279 143 | 2/2011 | |
| WO | WO 2009/135597 | 11/2009 | |

* cited by examiner

DEVICE FOR TRANSPORTING CONTAINERS, SUCH AS BEVERAGE BOTTLES

CONTINUING APPLICATION DATA

This application is a Continuation-In-Part application of International Patent Application No. PCT/EP2015/0075045, filed on Oct. 28, 2015, which claims priority from Federal Republic of Germany Patent Application No. 10 2014 117 358.9, filed on Nov. 26, 2014. International Patent Application No. PCT/EP2015/0075045 was pending as of the filing date of this application. The United States was an elected state in International Patent Application No. PCT/EP2015/0075045.

BACKGROUND

1. Technical Field

The present application relates to a device for transporting containers, such as beverage bottles.

2. Background Information

Background information is for informational purposes only and does not necessarily admit that subsequently mentioned information and publications are prior art.

The present application relates to a device according to the present application, and for example to a device for transporting containers, in particular bottles, in one possible exemplification PET bottles, in container handling systems. The present application further relates to a container gripper for gripping and holding containers according to the present application, in one possible exemplification for use with a device for transporting containers.

Container handling devices are known in many different configurations, such as filling machines, labeling machines, inspection machines, or rinsers, wherein these systems also comprise the most widely differing devices for the transporting of containers.

Some container handling devices comprise a plurality of container carriers in the form of container grippers, which are arranged on a circulating driven transport element or rotor or carousel. The spring elements of the container grippers which subject the gripping arms to tension in their closed position, and which interact with a blocking element, are formed from backwards-facing spring-elastic extensions of the gripping arms. These types of gripping arms are produced as one piece with these extensions. Such a design has the disadvantage, among others, that the choice of materials for the production of the gripping arms is severely restricted. The respective control element or blocking element is an eccentric element, against which the backwards-facing extension gripping arms are supported. The control element must be rotated about an axis parallel to the pivot axis of the gripping arms in order to control the change between a blocking state and a releasing state.

In another container handling device, a plurality of container grippers are arranged at a transport element driven such as to circulate about a machine axis, in each case with two gripping arms which are tensioned by spring force in their closure position. A closure element is allocated to each container gripper, which can be moved in a curve-controlled manner for blocking the gripping arms in a direction radially to the machine axis. The closure elements can be moved against the effect of a resetting spring into a closed position, in which the closure element engages in rider fashion straddling the two gripping arms and thereby blocks them against opening, i.e. against a movement apart from one another. There is accordingly an actual positive-fit blocking of the gripping arms by the closure element.

In another container gripper, gripping arms are provided which are pivotably mounted on a carrier plate, and which are tensioned by a pressure spring into a closed position. The containers can in this situation be pushed by inlet brace elements on the front sides of the gripping arms, under compression of the spring, into a container receiver formed by the gripping arms and located between them, and, conversely, can be drawn out of this container receiver again.

In another container gripper, the gripping arms can be replaced cheaply, easily, and even without the use of tools. This is achieved by a fixing element being positioned between bearing ends of the gripping arms, wherein the bearing ends comprise a peripheral cut-out opening. By pivoting the gripping arms into an extreme opening position, and by previous easing of a tension spring which creates the closure force for the gripping arms, the gripping arms are released from the fixing arrangement, such that they can be removed easily and without the use of tools. Also, for the securing of the respective container gripper on the transport element, a carrier body comprises deformable mounting plates made of an elastic material.

OBJECT OR OBJECTS

An object of the present application is to provide a device for transporting containers which, with a simplified structural design, also allows for a simplified control arrangement of the respective container gripper and its gripping arms between the blocking and release states.

SUMMARY

To solve this object, a device is configured in accordance with the present application. A container gripper is also an object of the present application.

The phrase "release state," in the meaning of the present application, signifies or refers to that state of the respective control element or blocking element, and therefore of the container gripper concerned, in which the gripping arms are only subjected to tension by the spring force of the spring elements in their closed state. The tension by the spring force of the spring elements is such that a secure transfer of the containers to the container gripper is possible, as well as a reliable handover of the containers by the container grippers, in each case by the movement of the gripping arms apart from one another, against the spring force. The phrase "blocking state," in the meaning of the present application, signifies or refers to that state of the respective blocking element, and therefore of the container gripper concerned, in which the gripping arms of the container gripper concerned are tensioned in their closed position by a spring force which is increased in relation to the release state. In principle, an actual positive-fit blocking does not take place in this situation.

The container grippers of the device according to the present application are possibly configured for a suspended holding of the containers at a container neck, forming the container opening, and/or at a ring or flange (neck ring) located at that point.

In a further exemplification of the present application, the device or the container gripper are configured, for example, as follows:

The control elements or blocking elements form at their ends, spaced apart from one another in the direction of the blocking element axis, further control surfaces for control curves, not moved together with the transport element, for moving the control elements or blocking elements between the first and second positions, or one blocking element is provided for each container gripper, or the spring elements of each container gripper are supported on both sides on a common blocking element, i.e. on at least two regions of the blocking element or the control surface which are offset against one another about the blocking element axis, or are located opposite one another in relation to the blocking element axis, or the blocking element axes are oriented parallel or essentially parallel to the pivot axes of the gripping arms, or the gripping arms of each container gripper form, at one end, a container receiver for gripping and holding the respective container, in one possible exemplification at a container neck comprising a container opening, or the control region of the at least one control element or blocking element of each container gripper is located on the side of the pivot axes of the gripping arms facing away from the container receiver, or the control element or blocking element is a control bolt or blocking bolt, or the second section of the control surface exhibits a greater distance interval from the blocking element axis than the first section of this control surface, or the first section is a circular cylindrical section or an essentially circular cylindrical section with a smaller diameter, and the second section is a circular cylindrical section or an essentially circular cylindrical section with an enlarged diameter, or the two gripping arms of each container gripper are in each case rotatably mounted on their own joint bolt, or the joint bolts are held in a common receiver, which, for example for easy assembly and dismantling of the respective container gripper, is held on the transport element by a latch engagement, or the spring elements are spring arms, which are connected by a first spring arm end in each case to a gripping arm, and are in each case in contact with a second spring arm end against the control surface of a control element or blocking element, or the spring arms are double-arm spring arms, which are pivotably held between their spring arm ends, in one possible exemplification in each case about an axis which is coaxial with the pivot axis of the associated gripping arm or on a common joint bolt with the associated gripping arm, or the spring arms comprise in each case, for their pivotable mounting, a bearing bushing or sleeve, in one possible exemplification a bearing bushing which is molded on, or each container gripper is configured in respect of its spring arms in such a way that the bearing bushing of the one spring arm is located on the outer side which faces away from the other spring arm, or each container gripper is configured in respect of its spring arms in such a way that the bearing bushing of each spring arm projects over its outer side, or the spring elements comprise a spring-elastic plastic or a spring-elastic metal, and are manufactured in one possible exemplification monolithically, as one piece with a bearing bushing, or the gripping arms are made of plastic or metal, or the control elements or blocking elements are made of metal or plastic, or the transport element is a transport element driven such as to rotate about a vertical or substantially vertical machine axis or is a corresponding rotor, or the control elements or blocking elements are in each case, in relation to the machine axis, offset radially inwards opposite the pivot axes of the gripping arms, or the spring arms are in contact with a first region or a first surface formed on a spring arm end in each case against the control surface of a control element and/or control element, and take effect in each case on a gripping arm with a second region or a second surface, likewise formed at the spring arm end, or the two regions or surfaces are provided located opposite one another at the spring arm end, and in this situation the respective spring arm end is formed between these regions or surfaces in a spring elastic manner, and in one possible embodiment by a double-wall formation forming a cut-out opening, or the gripping arms are in each case configured as double-armed, with at least two gripping arm sections extending away in opposite directions from a pivot axis of the gripping arms, of which a first gripping arm section is configured for gripping and holding the conveyors, and the at least one spring element or its spring arms interact with the other gripper arm section or a spring element assembly provided at this gripping arm section, wherein the foregoing features can be used not only individually but also in any desired combination.

"Containers" in the meaning of the present application are, for example, cans, bottles, barrels, and also kegs, in each case made of metal, glass, and/or plastic, for example from PET (polyethylene terephthalate). The containers can be used to hold liquids, such as beverages or other liquid consumer products.

The expression "essentially" or "some" or "approximately" signifies in the meaning of the present application deviations from the exact value in each case by +/−10%, in one possible exemplification by +/−5%, and/or deviations in the form of changes which are not of significance with regard to the function.

Further exemplifications and possible applications of the present application also derive from the following description of exemplary exemplifications and from the figures.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in detail hereinafter on the basis of figures associated with exemplifications. The figures show.

DESCRIPTION OF EXEMPLIFICATION OR EXEMPLIFICATIONS

Figure 1:
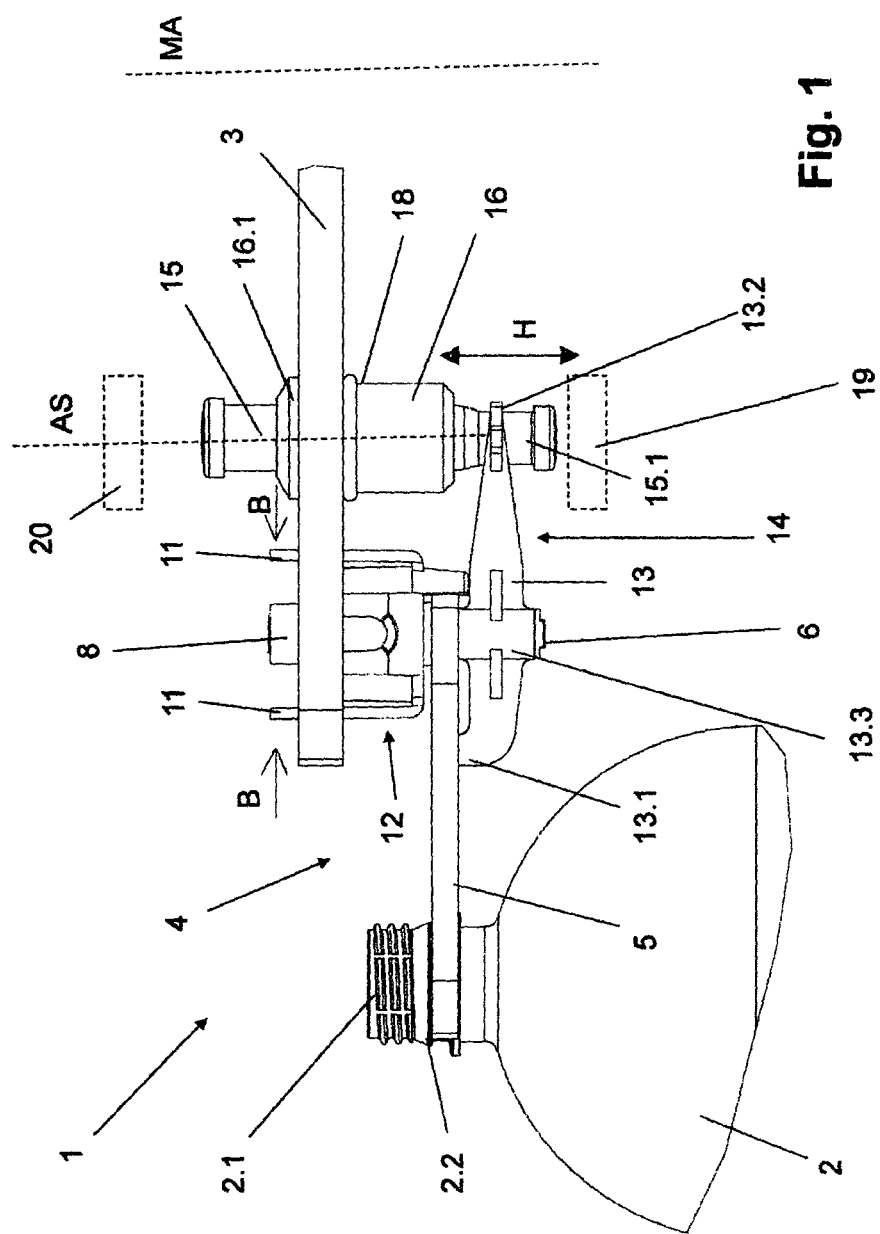
FIGS. 1 and 2, in an enlarged representation and in a side view, a container gripper provided on a transport element together with a container, and in one possible exemplification in its state secured to the transport element or, respectively, after removal from the transport element.

In the figures, there is shown a device 1 for the transporting of containers 2 in the form of bottles, such as large-volume bottles, and in one possible exemplification, such as bottles made of polyethylene terephthalate (PET). The device 1 comprises a carousel or rotor or transport element 3, which can be driven such as to rotate about a vertical or substantially vertical machine axis MA (arrow A). Container carriers in the form of container grippers 4 are provided at the circumference of the transport element 3, offset with respect to one another about the machine axis MA at uniform or essentially uniform angular distances. The container grippers 4 are configured, for example, as disk-shaped or essentially disk-shaped, and, in one possible exemplification, are configured for the suspended holding of the respective container 2 by a flange or neck ring 2.2 formed at the container neck below or above the container opening 2.1. Each container gripper 4 comprises, among other elements, two gripping arms 5. Each gripping arm 5 comprises a gripping portion and a pivot portion disposed at opposite ends of the gripping arm 5. Each gripping arm 5 is mounted in each case at the pivot portion, which is located radially closer to the machine axis MA than the gripping portion. The gripping arms 5 are designed to pivot at a joint bolt 6 about an axis parallel or essentially parallel to the machine axis MA. The gripping arms 5 are designed to be moved in opposite directions away from one another for opening the container gripper 4, and to be moved towards one another, also in opposite directions, in order to close the container gripper 4. At the gripping portions on the ends radially on the outside in relation to the machine axis MA, the gripping arms 5 are provided with cut-out openings 7. The cut outs or openings 7 supplement one another to form a container receiver in such a way that the respective container 2 is engaged around by the two gripping arms 5 at its container neck in clamp form, such as, for example, in an angle range of greater then one hundred eighty degrees. In the same way as the joint bolts 6, the gripping arms 5 of each container gripper 4 are offset in relation to one another in the circumferential direction or direction of rotation A of the transport element 3. As represented, the gripping arms 5 are provided in each case beneath the transport element 3, but project over the circumference of the transport element with their ends located radially on the outside in relation to the machine axis MA, that is, with their gripping portions located the furthest from the machine axis MA in an essentially radial direction.

Figure 2:
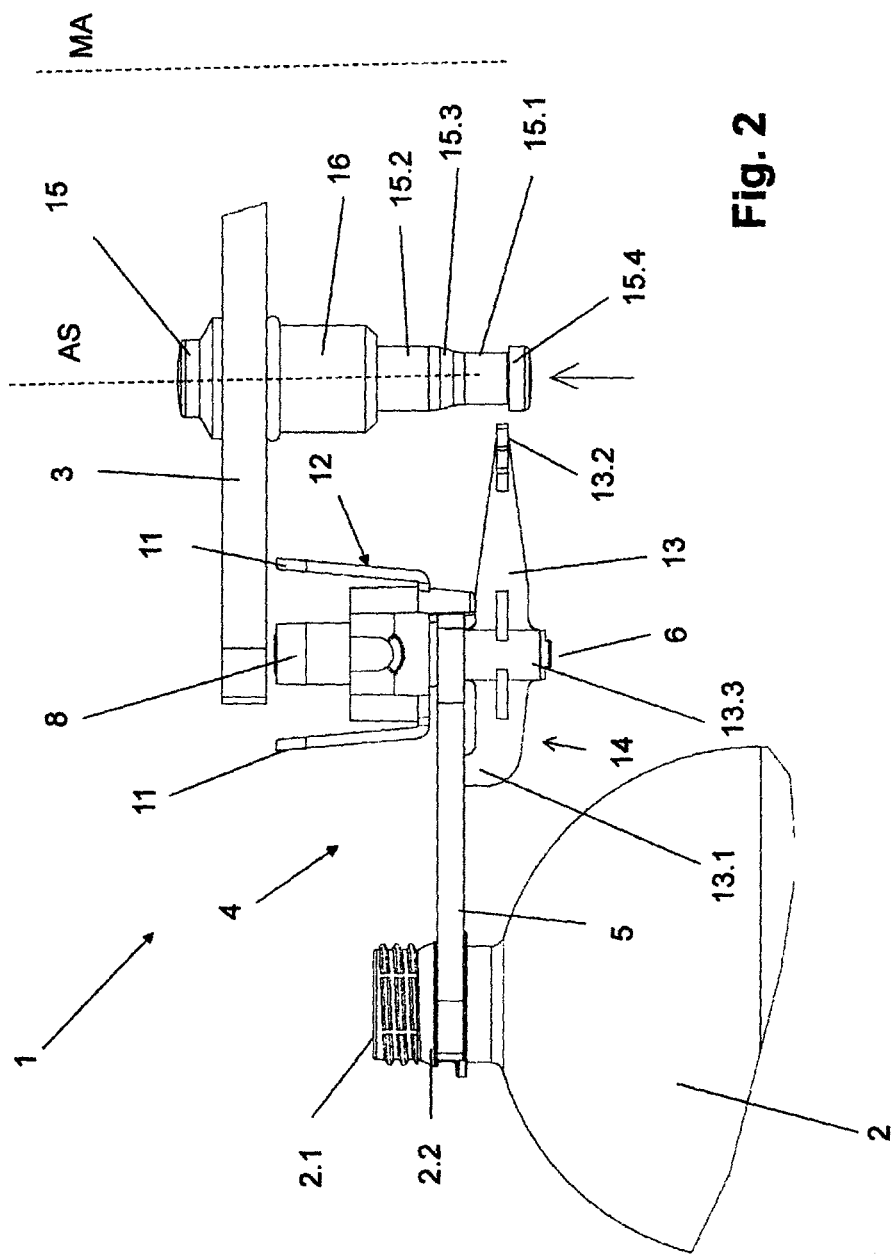

The joint bolts 6 are held in a bearing piece or a receiver 8 of the respective container gripper 4. The receivers 8, and therefore also the container grippers 4, are secured to the transport element 3 by a latch engagement. For this purpose, the transport element 3 comprises in its circumferential region, wherever a container gripper 4 is provided for, a first cut-out or opening 9, into which the respective receiver 8 is introduced from below, fitting or essentially fitting in place. The transport element 3 further comprises, in the region of each container gripper 4, on both sides of the cut-out opening 9, two further cut-outs or openings 10, which are mutually offset radially in relation to the machine axis MA, as well as opposite the cut-out 9. The two openings 10 in the transport element 3 serve to engage the two wings 11 of a latch element 12 in order to attach the container gripper 4 to the transport element 3. In one possible exemplification, the latch elements 12 are made as a one-piece structure or integral with the respective receiver 8. In one possible exemplification the two openings 10 engage the wings 11 in the region of their upper free ends in latches or shoulders or projections which are provided at the peripheral surfaces of the openings 10, remote from the opening 9. Due to the wings 11 being pressed together (arrows B in FIG. 2), the latch connection between the transport element 3 and the respective container gripper 4 can be released, such that the latter can then be taken downwards from the transport element 3, as represented in FIG. 2. The openings 9 and 10 are configured in each case in the form of longitudinal holes, and are oriented with their longitudinal extension in the transport direction.

In other words and to further explain, in one possible exemplification the wings 11 of the latch elements 12 are essentially flexible and resilient spring arms or clips that have an initial or original position as shown in FIG. 2. The wings 11 are spaced apart at a distance that exceeds the distance from the end of one opening 10 to the other. The wings 11 therefore must be pressed together to permit insertion into the openings 10. As seen in FIG. 1, the wings 11 are pressed closer together than in FIG. 2 in order to fit into the openings 10. Once the wings 11 are inserted a desired or sufficient distance through the openings 10, such that the upper portions of the wings 11 engage retaining structures in, on, or at the openings 10, the wings 11 are released. The resilient wings 11 exert a pressing force on the sides of the openings 10 to retain the latch element 12 in connection with the transport element 3 to minimize or essentially prevent the accidental or unintentional removal of the container gripper 4. The wings 11 provide a further retaining force as they comprise projecting portions that engage retaining structures or projections or shoulders at the openings 10, and thereby block or minimize the movement of the latch element 12 in a direction essentially parallel to the machine axis MA. To remove the latch element 12 and thus detach the container gripper 4, the wings 11 are pressed together and then passed out through the openings 10. The latch element 12 is designed, in one possible exemplification, to permit the attachment and detachment of the container gripper 4 by hand and/or without any tools.

Figure 6:
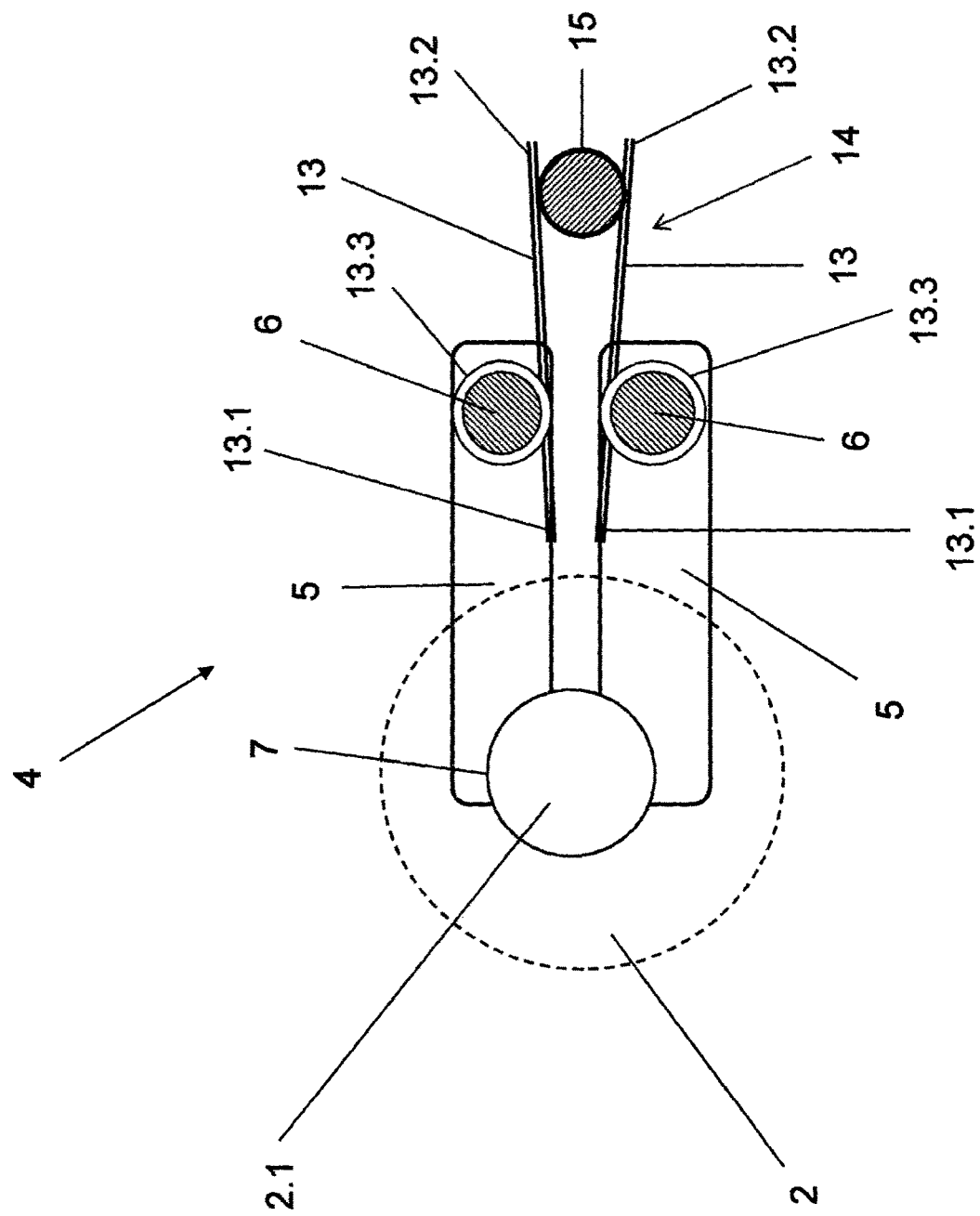
FIG. 6, a schematic function representation of the container gripper from FIG. 1.

Mounted on the lower end of each joint bolt 6, projecting out beyond the receiver 8, is not only the associated jointed arm 5, but also a double-arm or double-ended spring arm 13. The spring arm 13 is mounted such as to pivot about a middle portion located between its two spring arm ends 13.1 and 13.2. In the exemplification shown in FIGS. 1-6, the spring arm 13 includes a bearing bushing 13.3 beneath the respective gripping arm 5. The spring arms 13 are in each case configured such as to take effect in the manner of a leaf spring, and in the exemplification represented, as flat spring arms, which are arranged with their surface sides in planes parallel or essentially parallel to the axis of the associated joint bolt 6. In addition, the spring arms 13 are, in one possible exemplification, configured in such a way the bearing bushing 13.3, which can be molded on, of each spring arm 13 is located on the outer side of the arm, facing away from the other spring arm 13, or the bearing bushing 13.3 projects over this outer side (see, for example, FIG. 6). As will be explained in greater detail hereinafter, the spring arms 13 also form, in interaction with a control bolt or blocking bolt 15, a spring element 14, tensioning the two gripping arms 5 in their closed position, the spring force of which, taking effect on the gripping arms 5, is dependent on the position of the control bolt or blocking bolt 15.

Each spring arm 13 is connected at the spring arm end 13.1, which is offset radially outwards in relation to the machine axis MA, opposite the associated joint bolt 6, in positive fit to the gripping arm 5, pivotably mounted on the same joint bolt 6, and in one possible exemplification in a gripping arm region which is located radially at a distance from the joint bolt 6, and lies between the joint bolt 6 and the free end of the gripping arm 5. For the positive-fit connection, the spring arm end 13.1 engages, for example, into a corresponding cut-out of the gripping arm 5. The section forming the spring arm end 13.1, or the arm of the spring arm 13, therefore extends along at least a part length of the associated gripping arm 5.

In other words, in one possible exemplification, each spring arm 13 includes a spring arm end 13.1, which is the portion of the spring arm 13 located furthest out from the machine axis MA in a radial direction. The spring arm end 13.1 is connected or attached to the gripping arm 5 at a position between the joint bolt 6 and the free end or gripping portion of the gripping arm 5. In one possible exemplification, the spring arm end 13.1 comprises a projection or tab that inserts into a corresponding cut-out in the gripping arm 5 in order to connect the spring arm 13 to the gripping arm 5. Since both the spring arm 13 and the gripping arm 5 are pivotably mounted on or connected to the joint bolt 6, and since they are connected to one another, both the gripping arm 5 is moved or pivoted when the spring arm end 13.1 is moved or pivoted.

With its other spring arm end 13.2, which projects from the joint bolt 6 in the direction of the machine axis MA, each double-arm spring arm 13 is in contact against the casing surface or control surface of the control bolt or blocking bolt 15. In one possible exemplification, the spring arm ends 13.2 of both spring arms 13 of each container gripper 4 are supported at mutually opposing regions of the control surface of a common control bolt or blocking bolt 15. The control bolt 15 can elastically deform both spring arms 13 simultaneously, thereby producing a spring force which has the effect of closing the gripping arms 5 and therefore holding the respective container 2. It should be understood that an individual control bolt or blocking bolt 15 is provided for each container gripper 4.

Each control bolt or blocking bolt 15 is oriented with its axis AS parallel or essentially parallel to the axes of the joint bolts 6. Each control bolt 15 is held in a bearing sleeve 16, such that the control bolt 15 can be displaced in the direction of the axis AS (double arrow H). The bearing sleeve 16 is inserted into an opening 17 of the transport element 3. For securing in an axial direction, the bearing sleeve 16 is provided with a flange 16.1, which is in contact against a side of the transport element 3, such as, in the exemplification shown, against the upper side of the transport element 3. On the other side, such as, in the exemplification shown, the underside of the transport element 3, the bearing sleeve 16 is secured by an elastic retaining ring 18, which is pushed into place, engaging in a groove in the bearing sleeve 16 and in contact against the transport element.

Figure 3:
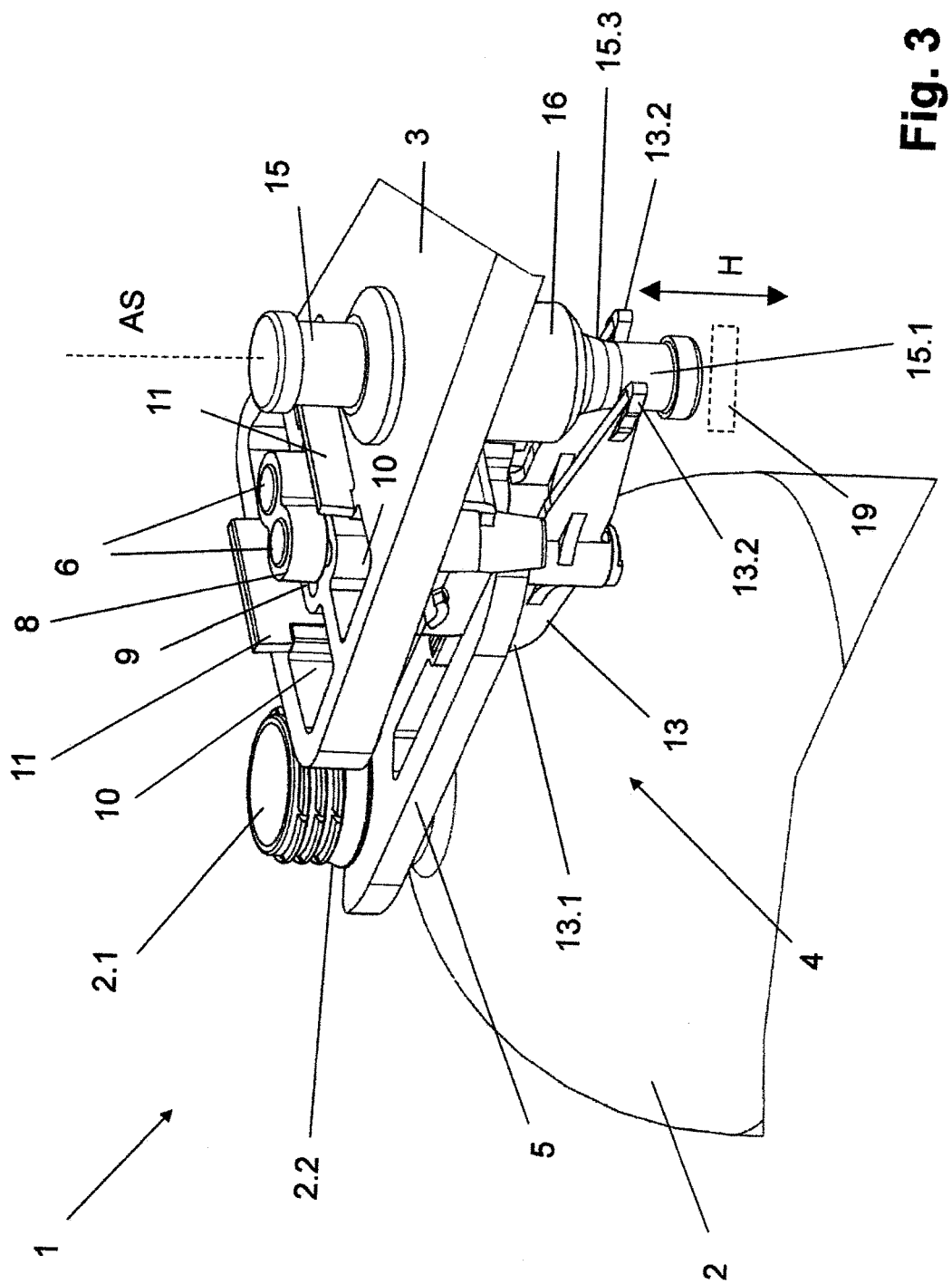
FIGS. 3 and 4, the container gripper from FIG. 1, in a perspective representation, and in one possible exemplification in the release state (FIG. 3) and in the blocking state (FIG. 4)
Figure 4:
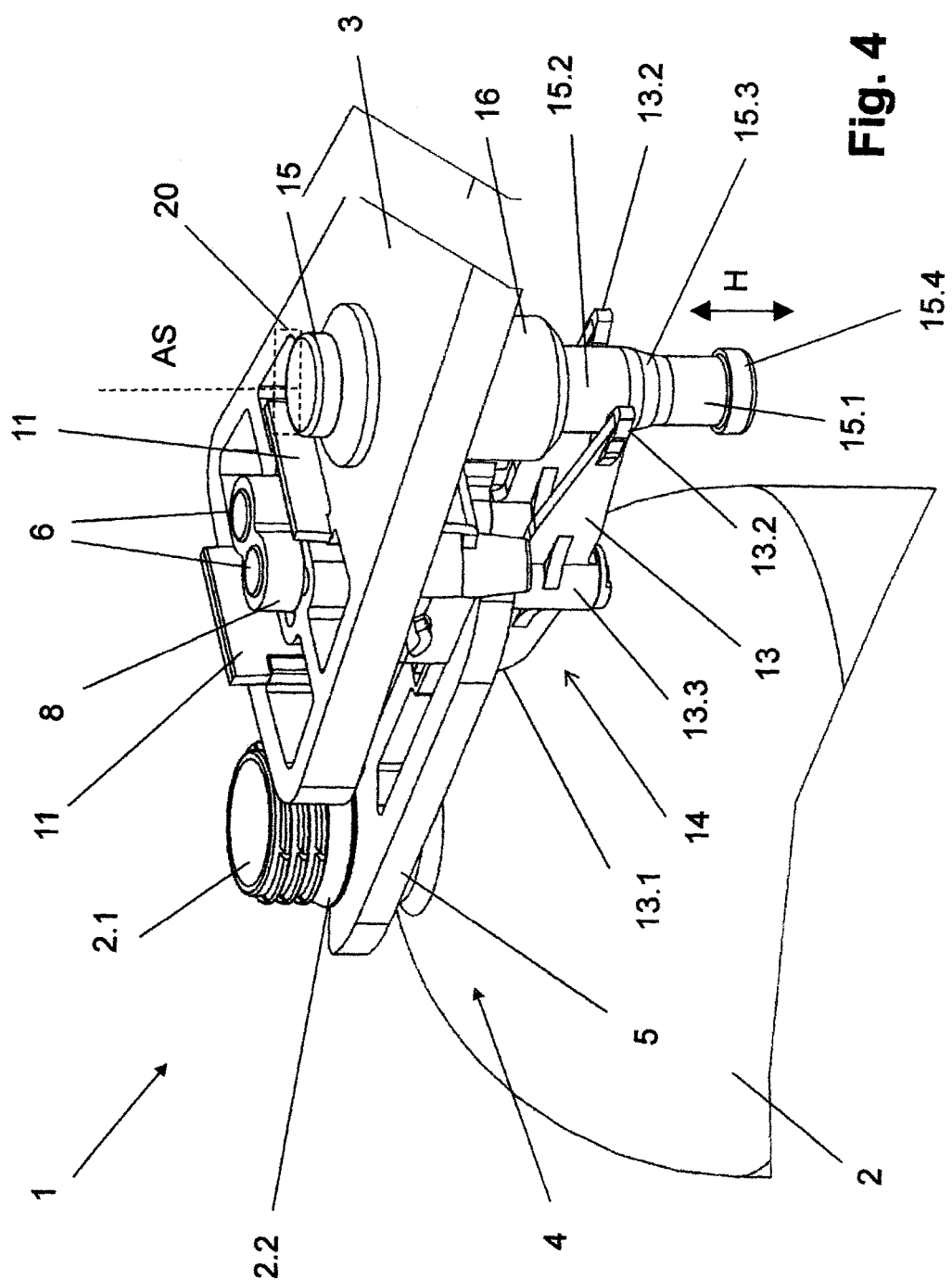
Figure 5:
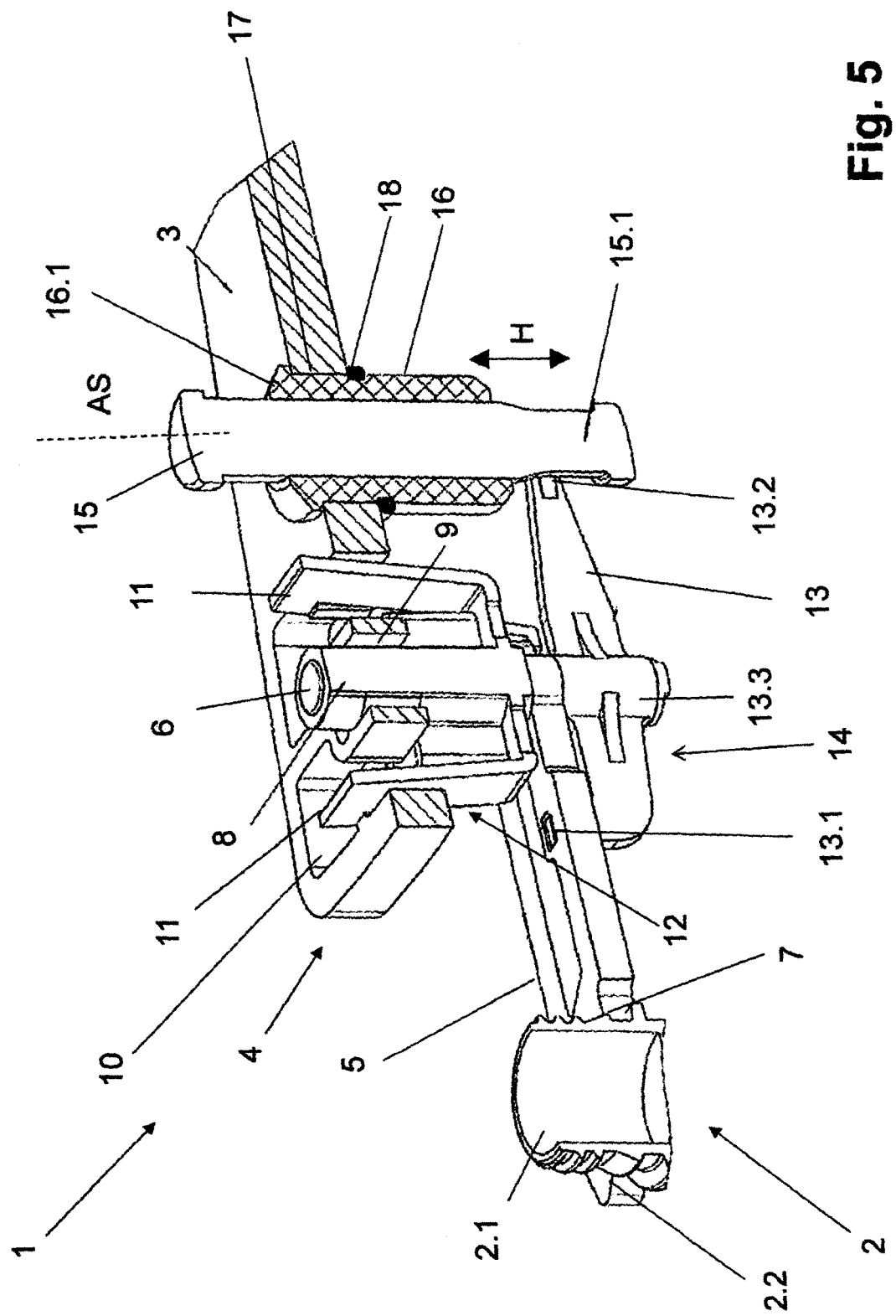
FIG. 5, the container gripper from FIG. 1 in a perspective representation and in a longitudinal section.

As can be seen in particular from FIGS. 3 and 4, each control bolt or blocking bolt 15 forms on its lower region, projecting out of the bearing sleeve 16, the control surface which interacts with the two spring arm ends 13.2. This surface is configured with a circular cylindrical section 15.1 with a smaller diameter, and with a circular cylindrical section 15.2, which exhibits a larger diameter in comparison with the section 15.1. This surface also includes a conical section 15.3, which connects the section 15.1 and the section 15.2. In the exemplification shown, the section 15.1 follows on to the lower free end of the control bolt or blocking bolt 15.

At the handover of a container 2 to a container gripper 4, and at the removal of a container 2 from a container gripper 4, the control bolt or blocking bolt 15 of this container gripper 4 is located in the position represented in FIG. 3, in which the two spring arm ends 13.2 are in contact against the section 15.1, and which corresponds to the release state. The spring force, which in this situation is exerted by the spring arms 13 onto the gripping arms 5, is sufficient to receive securely the respective container 2 at a container inlet of the device 1 by snapping or pressing or biasing the gripping arms 5 in at the container neck, but, at the same time, also allows for the container 2 to be taken off at the container outlet of the device 1, and, in one possible exemplification, by the spring-induced movement of the gripping arms 5 apart from one another.

In other words, the pressing or gripping or biasing force exerted on the spring arms 13, and thus on the gripping arms 5, when the smaller cylindrical section 15.1 of the control bolt 15 is engaged with the ends 13.2 of the spring arms 13 is sufficiently small or reduced to allow a container 2 to be pushed or forced between the gripper arms 5. The force of pushing a container 2 between the gripper arms 5 is sufficient to overcome the pressing force being exerted on the gripping arms 5 via the spring arms 13. However, the pressing or gripping force is sufficient to hold the container 2 in place with some strength once the container is fully inserted in between the gripping portions of the gripping arms 5. Likewise, containers 2 can be forcefully removed from the gripping arms 5 by overcoming the gripping force. In an alternative possible embodiment, instead of forcing the gripping arms 5 open by pressing the container 2 in between the gripping arms 5, the gripping arms 5 could be moved apart a distance sufficient to permit insertion and/or removal of a container without contacting the ends of the gripper arms 5.

After the taking up of a container 2, the vertically-extending or substantially vertically-extending control bolt or blocking bolt 15 of the container gripper 4 concerned is moved, by axial displacement, into the position corresponding to the blocking state, in which the two spring arm ends 13.2 are then in contact on both sides against the section 15.2. As a result, an increased spring force is produced by the spring arms 13 or the spring element 14 respectively, which tensions the gripping arms 13 in their closing position and holds the container 2.

Figure 7:
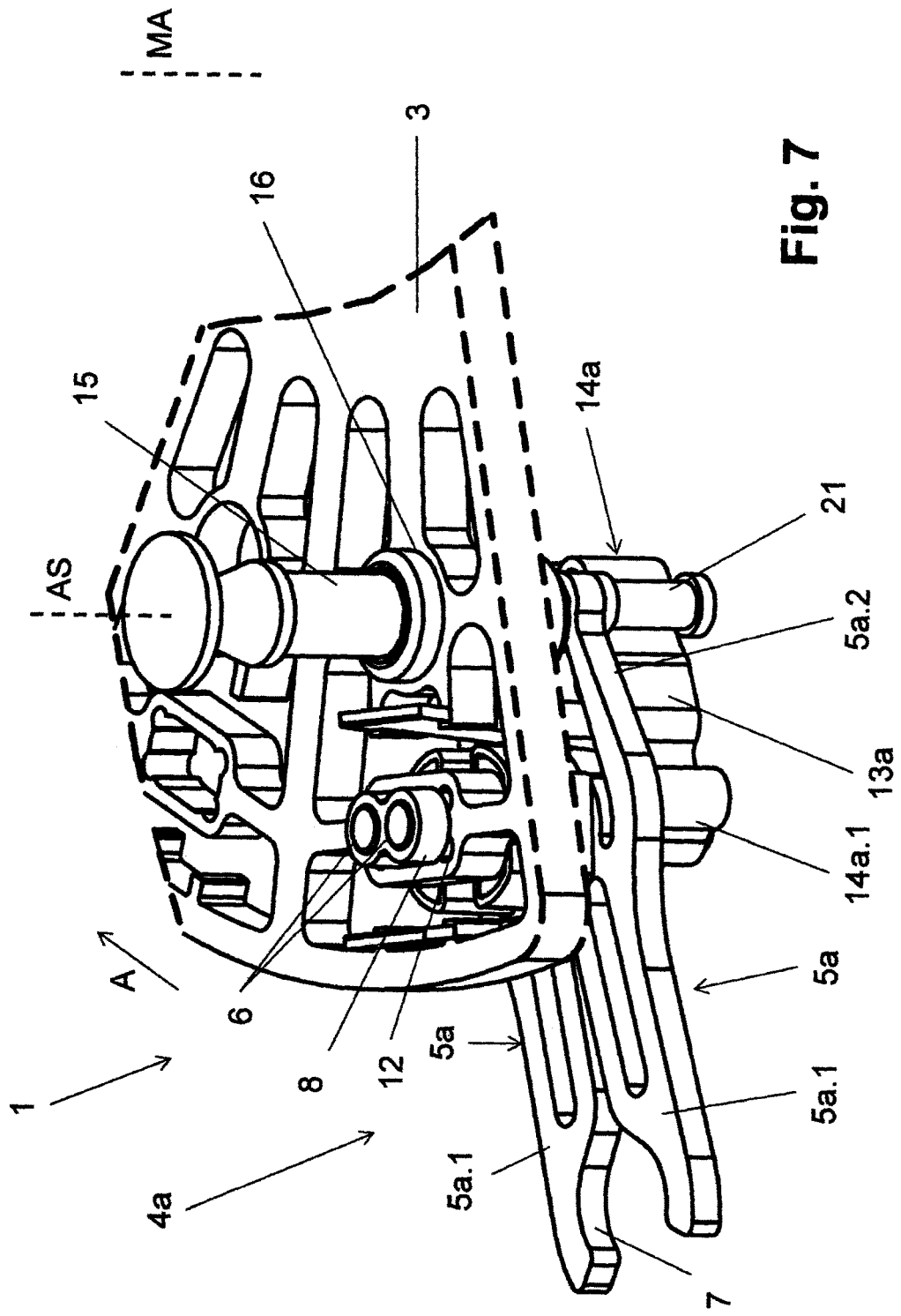
FIG. 7, in perspective representation and viewed from above, a further exemplification of the container gripper according to the present application, together with a partial representation of the transport element.
Figure 8:
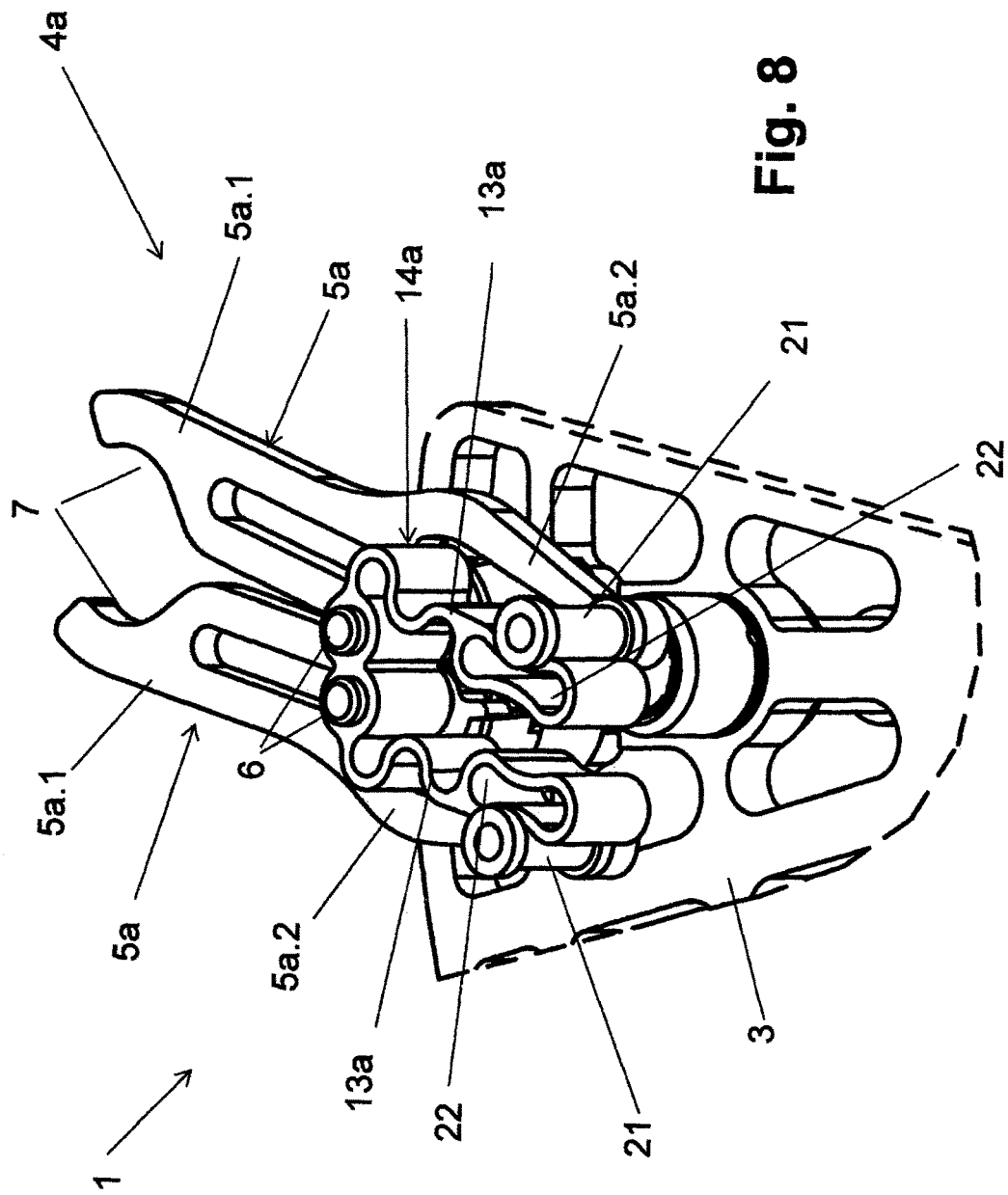
FIG. 8, in perspective representation and viewed from below, the container gripper from FIG. 7, together with the partial representation of the transport element.
Figure 9:
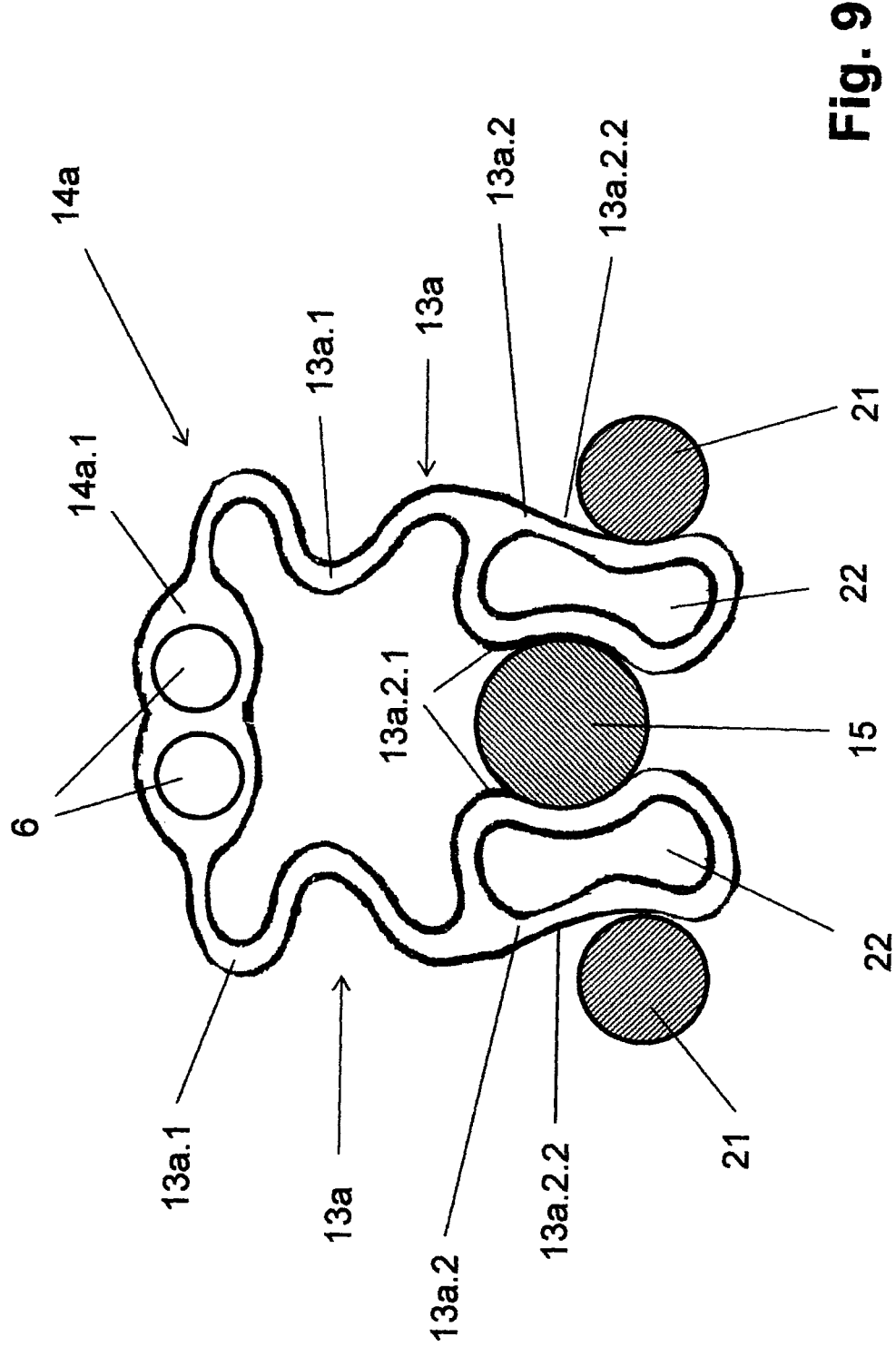
FIG. 9, in individual representation and viewed from above, a spring element of the container gripper from FIGS. 7 and 8.

FIGS. 7 through 9 show, in another possible exemplification, the device 1 with a container gripper 4a, which differs essentially from the container gripper 4 from FIGS. 1 through 6 in that, instead of the gripping arms 5, it has the two gripping arms 5a. In addition, instead of the spring device 14, formed by the two spring arms 13, the container gripper 4a comprises a spring device 14a, which is configured as being of one piece or a single unit or integrally formed with two spring arms 13a.

The container gripper 4a is provided together with a plurality of container grippers 4a of the same type at the circumference of the transport element 3, which circulates about the vertical or substantially vertical machine axis MA. The container gripper 4a, like the container gripper 4, is likewise configured for a suspended holding of the respective container 2 at its container flange or neck ring 2.2 formed beneath the container opening. The two gripping arms 5a are also rotatably mounted on the respective joint bolt 6, such as to rotate or pivot about the axis parallel or essentially parallel to the machine axis MA. In one possible exemplification, the gripping arms 5a are designed to move or pivot outwards, in opposite directions, for the opening of the container gripper 4a, and to move or pivot inwards towards one another, again in opposite directions, for closing the container gripper 4a. The joint bolts or joint axles 6 are held in the bearing piece or the receiver 8 of the container gripper 4a. The respective container gripper 4a is secured by the receiver 8 being placed into the opening 9 and by the latch engagement of the latch element 12 to the transport element 3, and in one possible exemplification in the same way as has been described in connection with FIGS. 1 through 6. According to one possible embodiment, in the assembled state, the two gripping arms 5a are in turn arranged below the level of the underside of the transport element 3.

At their ends located radially outside in relation to the machine axis MA, the gripping arms 5a are provided with cut-out openings 7, which are supplemented for receiving a container in that the respective container 2 is gripped by both gripping arms 5 around its container neck in the manner of a clamp, in an angle range of ideally greater than one hundred eighty degrees.

As FIGS. 7 and 8 show, the gripping arms 5a are configured in each case as double arms, and in one possible exemplification with one arm or gripper section 5a.1, which extends away from the associated joint bolt 6 radially outwards in relation to the machine axis MA and comprises the cut-out 7. The gripping arms 5a are also configured with one arm or gripper section 5a.2, which extends away from the associated joint bolt 6 radially or essentially radially inwards in relation to the machine axis MA. At the free end of the gripping arm section 5.2, remote from the associated joint bolt 6, a spring element assembly 21, in one possible exemplification in the form of a roll, is mounted such as to rotate about its axis parallel or essentially parallel to the axis of the joint bolts 6. The spring element assembly 21 is located in this situation on the underside of the gripping arm 5a, facing away from the transport element 3.

As FIG. 9 shows, the U-shaped single-piece spring element 14a comprises, among other elements, the two spring arms 13a, which are connected by means of a connection piece 14a.1 to the single-piece bow-shaped spring element 14a. The connection piece 14a.1 comprises passage openings for receiving at least one joint bolt, in this case for two joint bolts 6. The two spring arms 13a are in each case configured as upright, i.e. in an axial direction, perpendicular or substantially perpendicular to their longitudinal extension and parallel or substantially parallel to the axes of the joint bolts 6. The spring arms 13a have a width or height which is substantially greater than the material thickness of the spring arms 13a. In detail, the spring arms 13a are configured in such a way that in each case, going out from the connection section 14a.1, they form a spring arm section 13a.1, which in the exemplification represented is corrugated several times in order to attain a desired spring effect. Connected to the spring arm section 13a.1 is a spring arm section 13a.2, which forms the free end of the respective spring arm 13a and is configured as double-walled with an opening or cut-out 22. The spring arm section 13a.2 exhibits, in its cross-section plane perpendicular or substantially perpendicular to the axis of the joint bolt 6, an oval or substantially oval cross-section, which extends in the longitudinal direction of the respective spring arm 13a and is open on both sides in an axial direction parallel or substantially parallel to the axes of the joint bolts 6. On both sides of the cut-out 22, the spring arms 13a in each case form an inner surface 13a.2.1 and an outer surface 13a.2.2. These surfaces 13a.2.1 and 13a.2.2 are located at a distance from one another on each spring arm 13a. Between the surfaces 13a.2.1 and 13a.2.2, each spring arm 13a or spring arm section 13a.2 is configured as spring elastic or resilient through the cut-out 22. The inner surfaces 13a.2.1 of the two spring arms 13a face each other. The inner surfaces 13a.2.1 of the two spring arms 13a face away from each other.

As illustrated in FIG. 9, the inner surfaces 13a.2.1 interact with the control and blocking bolt 15, or with its sections 15.1-15.3. The outer surfaces 13a.2.2 are in contact in each case against a spring element assembly 21, in order to tension the two gripping arms 5a in their closed position by means of the spring element 14a arranged with the free ends of the spring arms 13a between the spring element assemblies 21.

The connection section 14a.1 is held at the two joint bolts 6, which are passed through by this connection section, and, in one possible exemplification, in such a way that the spring element 14a is located on the underside of the gripping arms 5a facing away from the transport element 3.

In this exemplification too, the control bolt or blocking bolt 15 is in turn movable axially in a controlled manner, i.e. in the direction of its blocking bolt axis AS. The control bolt 15 is guided in the bearing sleeve 16 at least between a position which corresponds to the blocking state of the container gripper 4a, i.e. corresponding to the increased clamping and holding force on the container 2 at the container gripper 4a, and a position which corresponds to the releasing state of the container gripper 4a, i.e. corresponding to the reduced clamping and holding force on the container 2 at the container gripper 4a.

In the releasing state, the section 15.1 of the control bolt or blocking bolt 15 is located between the two inner surfaces 13a.2.1, such that the closing or holding force of the gripping arms 5a is produced only, or essentially only, by the spring force of the spring arm sections 13a.1. In the blocking state, the two inner surfaces 13a.1 are in contact against the section 15.2 of the control bolt or blocking bolt 15, such that the closing force of the gripping arms 5a is mainly determined by the much reduced elastic deformability of the spring arm sections 13a.2 comprising the cut-outs 22, and is therefore substantially greater than the closing force in the position of the control bolt or blocking bolt 15 corresponding to the releasing state.

The configuration described of the spring element 14a has the advantage not only of facilitating production and assembly by way of the one-piece configuration, but in particular also the advantage that, in the releasing and blocking states, the closing force is produced, in the final analysis, by different spring arm sections of the spring element 14a. As a result, substantial differences in the spring forces for the blocking and releasing states can be achieved, and, by appropriate shaping of the spring arm sections 13a.1 and 13a.2, the spring forces for the blocking and releasing states can be adjusted, at least very largely independently of one another.

In other words, corrugated or wavy or curved configuration or shape of spring arm section 13a.1 renders the spring arms 13a much more bendable or pliable than if they were straight. As a result, while the spring arms 13a produce a pressing force on the gripper arms 5a, the force is reduced or minimized such that it facilitates the insertion of a container 2 between the gripper arms 5a with reduced or minimized force or effort. In other words, this configuration makes it easier to insert the containers 2 in between the gripper arms and remove the containers 2 from the gripper arms 2. However, since it is desirable to hold the containers 2 firmly while the device 1 is handling the containers, such as during a filling or closing or labeling operation, the configuration or design of the spring arm section 13a.2 produces an increase pressing or holding or gripping force. To further explain, when the control bolt 14 is moved such that the larger control bolt section 15.2 engages the inner surfaces 13a.2.1, the spring arm sections 13a.2 are compressed between the control bolt section 15.2 and the spring element assemblies 21. As the flexible or bendable spring arm sections 13a.2 are compressed, they become stiffer and/or more resistant to compression. The spring arms sections 13a.2 thereby generate or transfer an increased pressing force against the spring element assemblies 21, which are connected to the gripper arms 5a. As a result, the increased pressing or gripping force is applied or transferred to the container 2 between the gripper arms 5a. By employing this configuration, the pressing force is quite reduced or minimized to facilitate ease of insertion and removal of a container 2 without a corresponding reduction in the gripping force utilized during handling of the container 2. In addition, the pressing force can be increased or maximized to maintain a strong or firm grip on the container 2 during handling of the container 2 without a corresponding increase in the pressing force during the insertion and removal of the container 2. The configuration shown in FIGS. 7-9 achieves an easy insertion and removal of the container 2 while maintaining a strong or firm grip on the container 2 during a container handling operation, such as container filling, closing, or labeling.

The moving of the control bolt or blocking bolt 15 between its position corresponding to the releasing state and its position corresponding to the closing or blocking state takes place with the container grippers 4 and 4a in a particularly or relatively simple manner by curve control or cam arrangement. For example, the control bolt or blocking bolt 15, before reaching a container inlet and before reaching a container outlet, is moved in each case by a control curve 19 (FIGS. 1 and 3), which does not circulate with the transport element 3, into its position corresponding to the releasing state. In the exemplifications shown, the control bolt 15 is first raised, and, after passing the container inlet, is then moved by a further control curve 20 (FIGS. 1 and 4), which does not circulate with the transport element 3, into its position corresponding to the blocking state, i.e. in the exemplifications represented it is lowered. The control curves 19 and 20, which take effect on the lower end of the control bolt or blocking bolt 15 (control curve 19) or, respectively, on the upper end of the control bolt or blocking bolt 15 (control curve 20), can be configured as very short, since the control bolt or blocking bolt 15 is not tensioned in either of the two positions, and in both positions is adequately secured in each case by the clamping effect of the spring arms 13.

The gripping arms 5 and 5a, the joint bolts 6, and also the control bolt or blocking bolt 15, comprise in one possible exemplification a metallic material, such as special steel or spring steel, while the receiver 8 is in one possible exemplification a molded part made of plastic. The spring arms 13 and the spring element 14a are, in one possible exemplification, also independent component parts in relation to the gripping arms 5 and 5a, and can therefore be made of a material which differs from the material of the gripping arms 5 and 5a. The spring arms 13 or spring elements 14a, in one possible exemplification, are made from a suitable material, such as an adequately spring-elastic plastic and/or a spring-elastic metallic material. The spring arms 13 are, in one possible exemplification, made in each case as one piece with their bearing bushing 13.3.

Just as the container grippers 4 and 4a are held by latch engagement on the transport element 3, so too can the associated control bolt or blocking bolt 15. If required and/or desired, such as for repair and/or cleaning purposes, the container grippers 4 and 4a can be dismantled with no or very little problem by simply drawing the control bolt 15 out of its bearing sleeve 16. In order to limit the lift movement of the control bolt or blocking bolt 15 into the position corresponding to the releasing state, the control bolt or blocking bolt 15 is provided, in each case, at its lower end and in the section 15.1 connected to it, with a projecting collar 15.4. If the blocking bolt 15 is raised to an excessive amount, the spring arm ends 13.2 or the spring arm sections 13a.2 come in contact with the projecting collar 15.4.

Regardless of the differences which exist, the container grippers according to the present application, and in this context also the exemplifications described, have it in common that, in the blocking state of the container grippers, their gripping arms are not rigidly or positive-fit blocked in the closed position by the respective control bolt or blocking bolt, but, rather, are tensioned by a spring force into the closed position, this force being increasable as desired or required to adequately hold the containers during handling.

The present application has been explained heretofore by exemplifications. It is understood that numerous modifications and derivations are possible, without thereby departing from the inventive concept underlying the present application. It is also possible in one possible exemplification, for example, instead of the spring arms 13 or the spring element 14a, to provide for other spring elements, which in each case likewise take effect between a gripper arm 5 or 5a and the control surface of the control bolt or blocking bolt 15.

The present application relates to a device for transporting containers, comprising a transport element and several container grippers 4 which are provided on the transport element and which are provided for gripping and maintaining the containers. Each container gripper comprises at least two pivotable gripping arms which are respectively pretensioned by at least one spring element in a closed position.

One feature or aspect of an exemplification is believed at the time of the filing of this patent application to possibly reside broadly in a device for transporting containers 2, comprising a transport element 3 and including a plurality of container grippers 4, 4a provided at the transport element 3 for gripping and holding the containers 2, wherein each container gripper 4, 4a comprises at least two pivoting gripping arms 5, 5a, which are tensioned by at least one spring element 14, 14a into a closed position, and at least one control element or blocking element 15, which forms at least one control surface with at least two sections 15.1, 15.2, supported on which are the spring elements 14 taking effect on the gripping arms 5, 5a, and which can be moved at least between a first position, corresponding to a releasing state of the container gripper 4, 4a, in which the respective spring element 14, 14a is supported at a first section 15.1 of the control surface, and a second position, corresponding to a blocking state of the container gripper 4, 4a, in which the respective spring element 14, 14a, additionally tensioned, is supported at a second section 15.2 of the control surface, wherein the respective control element or blocking element 15 can be moved axially in a blocking element axis AS between the first and second position, and that the sections 15.1, 15.2 are provided in the blocking element axis AS following one another.

Another feature or aspect of an exemplification is believed at the time of the filing of this patent application to possibly reside broadly in the device, wherein the control elements or blocking elements 15 form, at their ends located at a distance from one another in the direction of the blocking element axis AS, further control surfaces for control curves 19, 20, not moved with the transport element 3, for the moving of the control elements or blocking elements 15 between the first and second position.

Yet another feature or aspect of an exemplification is believed at the time of the filing of this patent application to possibly reside broadly in the device, wherein for each container gripper 4, 4a only one blocking element 15 is provided, and that the at least one spring element 14, 14a of the container gripper 4, 4a is supported on both sides at this blocking element 15, i.e. on at least two regions of the blocking element 15 or the control surface, located offset against one another about the blocking element axis AS or opposite one another in relation to the blocking element axis AS.

Still another feature or aspect of an exemplification is believed at the time of the filing of this patent application to possibly reside broadly in the device, wherein the blocking element axes AS are oriented parallel or essentially parallel to the pivot axes of the gripping arms 5.

A further feature or aspect of an exemplification is believed at the time of the filing of this patent application to possibly reside broadly in the device, wherein the gripping arms 5, 5a of each container gripper 4, 4a are located at one end of a container receiver for gripping and holding the respective container 2, and that the control region 15.1-15.3 of the at least one control element or blocking element 15 of each container gripper 4 is located on the side of the pivot axes 6 of the gripping arms 5, 5a facing away from the container receiver.

Another feature or aspect of an exemplification is believed at the time of the filing of this patent application to possibly reside broadly in the device, wherein the control element or blocking element is a control bolt or blocking bolt 15.

Yet another feature or aspect of an exemplification is believed at the time of the filing of this patent application to possibly reside broadly in the device, wherein the second section 15.2 of the control surface exhibits a greater distance interval from the blocking element axis AS than the first section 15.1 of this control surface, wherein the first section 15.1 is a circular cylindrical or essentially circular cylindrical section with smaller diameter, and the second section 15.2 is a circular cylindrical or essentially circular cylindrical section with enlarged diameter.

Still another feature or aspect of an exemplification is believed at the time of the filing of this patent application to possibly reside broadly in the device, wherein the two gripping arms 5, 5a of each container gripper 4, 4a are in each case mounted such as to pivot on an individual joint bolt 6, and that the joint bolts 6 are held in a common receiver 8, which, for simple assembly and dismantling of the respective container gripper 4, 4a, is held by latching to the transport element 3.

A further feature or aspect of an exemplification is believed at the time of the filing of this patent application to possibly reside broadly in the device, wherein the spring elements 14 form spring arms 13 or in each case at least two spring arms 13a.

Another feature or aspect of an exemplification is believed at the time of the filing of this patent application to possibly reside broadly in the device, wherein the spring arms 13 are connected by a first spring arm end 13.1 in each case to a gripper arm 5, and, with a second spring arm end 13.2, are in contact in each case against the control surface of a control element or blocking element 15, wherein the spring arms 13 are double-arm spring arms, which are held such as to pivot between their spring arm ends 13.1, 13.2, and in each case about an axis coaxial with the pivot axis 6 of the associated gripper arm 5 or on a common joint bolt 6 with the associated gripper arm 5.

Yet another feature or aspect of an exemplification is believed at the time of the filing of this patent application to possibly reside broadly in the device, wherein the spring arms 13a are in contact with a first area or a first surface 13a.2.1 formed on a spring arm end 13a.2 in each case against the control surface of a control element and/or blocking element 15, and with a second region or a second surface 13a.2.2, likewise formed at the spring arm end 13a.2, take effect in each case onto a gripping arm 5a, wherein the two regions or surfaces 13a.2.1, 13a.2.2 are provided opposite one another at the spring arm end 13a.2, and in this situation the respective spring arm end 13a.2 is formed as spring-elastic between these regions or surfaces 13a.2.1, 13a.2.2, and by a double-wall configuration forming at least one cut-out 20.

Still another feature or aspect of an exemplification is believed at the time of the filing of this patent application to possibly reside broadly in the device, wherein the gripping arms 5a are configured in each case as double-armed with at least two gripping arm sections 5a.1, 5a.2, extending in opposite directions away from a pivot axis 6 of the gripping arms 5a, of which a first gripping arm section 5a.1 is configured for gripping and holding the containers 2, and that the at least one spring element 14a or its spring arms 13a interacts with the other gripping arm section 5a.2 or with a spring element assembly 21 provided at this gripping arm section 5a.

A further feature or aspect of an exemplification is believed at the time of the filing of this patent application to possibly reside broadly in the device, wherein the spring element 14a is arranged with its spring arm end 13a.2 between the second gripping arm sections 5a.2 or the spring element assemblies 21 located there of the respective container gripper 4a.

Another feature or aspect of an exemplification is believed at the time of the filing of this patent application to possibly reside broadly in the device, wherein the spring element 14a is configured as one piece with two spring arms 13a, and/or that the spring elements 14, 14a are made of a spring-elastic plastic or of a spring-elastic metal, and the gripping arms 5, 5a and/or the control elements or blocking elements 15 are made of metal or plastic.

Another feature or aspect of an exemplification is believed at the time of the filing of this patent application to possibly reside broadly in the device, wherein the transport element 3 is a transport element or a corresponding rotor, driven such as to circulate about a vertical or substantially vertical machine axis MA, and that the control elements or blocking elements 15 are arranged, in each case related to the machine axis MA, opposite the pivot axes of the gripping arms 5, offset radially inwards.

One feature or aspect of an exemplification is believed at the time of the filing of this patent application to possibly reside broadly in a container gripper for gripping and holding containers 2, with at least two pivoting gripping arms 5, 5a and with at least one spring element 14, 14a, which takes effect by means of spring arms 13, 13a onto the gripping arms 5, 5a, and tensions the gripping arms 5, 5a into a closed position, wherein the spring element 14, 14a or its spring arms 13, 13a form spring arm ends 13.2, 13a.2 for contact against a control surface of a control element or blocking element 15, which changes the spring force of the spring arms 13 or of the spring element 14.

Another feature or aspect of an exemplification is believed at the time of the filing of this patent application to possibly reside broadly in the container gripper, wherein the spring arms are double-arm spring arms 13, which are held such as to pivot between their spring arm ends 13.1, 13.2, in each case about an axis co-axial with the pivot axis 6 of the associated gripping arms 5 or on a common joint bolt 6 with the associated gripping arm 5.

Yet another feature or aspect of an exemplification is believed at the time of the filing of this patent application to possibly reside broadly in the container gripper, wherein the two gripping arms 5 are in each case mounted such as to pivot on an individual joint bolt 6, and that the joint bolts 6 are held in a common receiver 8, which, for simple assembly and dismantling of the respective container gripper 4 can be secured by latching to a transport element 3.

Still another feature or aspect of an exemplification is believed at the time of the filing of this patent application to possibly reside broadly in the container gripper, wherein the spring arms 13a are configured with a first region or a first surface 13a.2.1 formed at a spring arm end 13a.2 for contacting against the control surface of a control element and/or blocking element 15 and with a second region or a second surface 13a.2.2, likewise formed at the spring arm end 13a.2, for taking effect on a gripping arm 5a, that the two regions or surfaces 13a.2.1, 13a.2.2 are provided, located opposite one another, at the spring arm end 13a.2, and that the spring arm end 13a.2 is formed as spring-elastic between these regions or surfaces 13a.2.1, 13a.2.2, and by a double-walled configuration forming at least one cut-out opening 22.

A further feature or aspect of an exemplification is believed at the time of the filing of this patent application to possibly reside broadly in the container gripper, wherein the spring arms 13 are made of a spring-elastic plastic or of a spring-elastic metal and the gripping arms 5 are made of metal.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following patents, patent applications, patent publications, and other documents are hereby incorporated by reference as if set forth in their entirety herein, except for the exceptions indicated herein: DE 10 2005 014 838 A1, having the title "Klammer zum Halten von Gefässen", published on Oct. 5, 2006; DE 10 2012 011 367 A1, having the title "Greiferanordnung", published on Dec. 12, 2013; DE 297 13 510 U, having the title "Rotationsfüller", published on Aug. 27, 1998; and EP 2 279 143 A1, having the title "DEVICE FOR GRIPPING AND HOLDING PET BOTTLES", published on Feb. 2, 2011.

All of the patents, patent applications, patent publications, and other documents, except for the exceptions indicated herein, which were cited in the International Search Report dated Feb. 8, 2016, and/or cited elsewhere, as well as the International Search Report document itself, are hereby incorporated by reference as if set forth in their entirety herein except for the exceptions indicated herein, as follows: WO 2009/13559, having the title "PET BOTTLE GRIPPER", published on Nov. 12, 2009; DE 10 2008 055 616 A1, having the title "Vorrichtung zum Greifen von PET-Flaschen in Flaschenabfüllanlagen oder dergleichen", published on May 27, 2010; EP 2 138 434 A1, having the title "Gripper and related apparatus for handling objects", published on Dec. 30, 2009; and U.S. Pat. No. 8,672,376, having the title "Gripping device", published on Mar. 18, 2014.

The corresponding foreign and international patent publication applications, namely, Federal Republic of Germany Patent Application No. 10 2014 117 358.9, filed on Nov. 26, 2014, having inventors Andreas FAHLDIECK and Nils MALLITZKI, and DE-OS 10 2014 117 358.9 and DE-PS 10 2014 117 358.9, and International Application No. PCT/EP2015/075045, filed on Oct. 28, 2015, having WIPO Publication No. WO 2016/083065 and inventors Andreas FAHLDIECK and Nils MALLITZKI, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2015/075045 and German Patent Application 10 2014 117 358.9, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2015/075045 and DE 10 2014 117 358.9 from which this patent application claims priority which do not have to do with the correction of the translation in this patent application are not to be included in this patent application in the incorporation by reference.

Any statements about admissions of prior art in the original foreign patent applications PCT/EP2015/075045 and DE 10 2014 117 358.9 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

AT LEAST PARTIAL NOMENCLATURE

1 Device
2 Container
2.1 Container mouth
2.2 Mouth flange
3 Star-shaped or disk-shaped transport element
4, 4a Container gripper
5, 5a Gripper arm
5a.1, 5a.2 Gripper arm section
6 Joint bolt
7 Cut-out
8 Receiver
9, 10 Cut-out
11 Wing
12 Latch element
13, 13a Spring arm
13.1, 13.2 Spring arm end
13.3 Bearing sleeve
13a.1, 13a.2 Spring arm section
13a.2.1, 13a.2.2 Surface or region
14, 14a Spring element
15 Control bolt or blocking bolt
15.1-15.3 Section
15.4 Collar
16 Bearing sleeve
16.1 Flange
17 Opening
18 Ring
19, 20 Control curve
21 Spring element assembly
22 Cut-out
A Direction of rotation of the transport element 3
B Force effect to release the container gripper
H Control lift of the control bolt or blocking bolt
AS Axis of the control bolt or blocking bolt
MA Machine axis

What is claimed is:

1. Device for transporting containers (2), comprising a transport element (3) and including a plurality of container grippers (4, 4a) provided at the transport element (3) for gripping and holding the containers (2), wherein each container gripper (4, 4a) comprises at least two pivoting gripping arms (5, 5a), which are tensioned by at least one spring element (14, 14a) into a closed position, and at least one control element or blocking element (15), which forms at least one control surface with at least two sections (15.1, 15.2), supported on which are the spring elements (14) taking effect on the gripping arms (5, 5a), and which can be moved at least between a first position, corresponding to a releasing state of the container gripper (4, 4a), in which the respective spring element (14, 14a) is supported at a first section (15.1) of the control surface, and a second position, corresponding to a blocking state of the container gripper (4, 4a), in which the respective spring element (14, 14a), additionally tensioned, is supported at a second section (15.2) of the control surface, wherein the respective control element or blocking element (15) can be moved axially in a blocking element axis (AS) between the first and second position, and that the sections (15.1, 15.2) are provided in the blocking element axis (AS) following one another, and wherein the control elements or blocking elements (15) form, at their ends located at a distance from one another in the direction of the blocking element axis (AS), further control surfaces for control curves (19, 20), not moved with the transport element (3), for the moving of the control elements or blocking elements (15) between the first and second position.

2. Device according to claim 1, wherein for each container gripper (4, 4a) only one blocking element (15) is provided, and that the at least one spring element (14, 14a) of the container gripper (4, 4a) is supported on both sides at this blocking element (15), i.e. on at least two regions of the blocking element (15) or the control surface, located offset against one another about the blocking element axis (AS) or opposite one another in relation to the blocking element axis (AS).

3. Device according to claim 2, wherein the blocking element axes (AS) are oriented parallel or essentially parallel to the pivot axes of the gripping arms (5).

4. Device according to claim 3, wherein the gripping arms (5, 5a) of each container gripper (4, 4a) are located at one end of a container receiver for gripping and holding the respective container (2), and that the control region (15.1-15.3) of the at least one control element or blocking element (15) of each container gripper (4) is located on the side of the pivot axes (6) of the gripping arms (5, 5a) facing away from the container receiver.

5. Device according to claim 4, wherein the control element or blocking element is a control bolt or blocking bolt (15).

6. Device according to claim 5, wherein the second section (15.2) of the control surface exhibits a greater distance interval from the blocking element axis (AS) than the first section (15.1) of this control surface, wherein the first section (15.1) is a circular cylindrical or essentially circular cylindrical section with smaller diameter, and the second section (15.2) is a circular cylindrical or essentially circular cylindrical section with enlarged diameter.

7. Device according to claim 6, wherein the two gripping arms (5, 5a) of each container gripper (4, 4a) are in each case mounted such as to pivot on an individual joint bolt (6), and that the joint bolts (6) are held in a common receiver (8), which, for simple assembly and dismantling of the respective container gripper (4, 4a), is held by latching to the transport element (3).

8. Device according to claim 7, wherein the spring elements (14) form spring arms (13) or in each case at least two spring arms (13a).

9. Device according to claim 8, wherein the spring arms (13) are connected by a first spring arm end (13.1) in each case to a gripper arm (5), and, with a second spring arm end (13.2), are in contact in each case against the control surface of a control element or blocking element (15), wherein the spring arms (13) are double-arm spring arms, which are held such as to pivot between their spring arm ends (13.1, 13.2), and specifically in each case about an axis coaxial with the pivot axis (6) of the associated gripper arm (5) or on a common joint bolt (6) with the associated gripper arm (5).

10. Device according to claim 8, wherein the spring arms (13*a*) are in contact with a first area or a first surface (13*a*.2.1) formed on a spring arm end (13*a*.2) in each case against the control surface of a control element and/or blocking element (15), and with a second region or a second surface (13*a*.2.2), likewise formed at the spring arm end (13*a*.2), take effect in each case onto a gripping arm (5*a*), wherein the two regions or surfaces (13*a*.2.1, 13*a*.2.2) are provided opposite one another at the spring arm end (13*a*.2), and in this situation the respective spring arm end (13*a*.2) is formed as spring-elastic between these regions or surfaces (13*a*.2.1, 13*a*.2.2), and specifically by a double-wall configuration forming at least one cut-out (20).

11. Device according to claim 8, wherein the gripping arms (5*a*) are configured in each case as double-armed with at least two gripping arm sections (5*a*.1, 5*a*.2), extending in opposite directions away from a pivot axis (6) of the gripping arms (5*a*), of which a first gripping arm section (5*a*.1) is configured for gripping and holding the containers (2), and that the at least one spring element (14*a*) or its spring arms (13*a*) interacts with the other gripping arm section (5*a*.2) or with a spring element assembly (21) provided at this gripping arm section (5*a*).

12. Device according to claim 11, wherein the spring element (14*a*) is arranged with its spring arm end (13*a*.2) between the second gripping arm sections (5*a*.2) or the spring element assemblies (21) located there of the respective container gripper (4*a*).

13. Device according to claim 12, wherein the spring element (14*a*) is configured as one piece with two spring arms (13*a*), and/or that the spring elements (14, 14*a*) are made of a spring-elastic plastic or of a spring-elastic metal, and the gripping arms (5, 5*a*) and/or the control elements or blocking elements (15) are made of metal or plastic.

14. Device according to claim 13, wherein the transport element (3) is a transport element or a corresponding rotor, driven such as to circulate about a vertical machine axis (MA), and that the control elements or blocking elements (15) are arranged, in each case related to the machine axis (MA), opposite the pivot axes of the gripping arms (5), offset radially inwards.

15. Container gripper for gripping and holding containers (2), with at least two pivoting gripping arms (5, 5*a*) and with at least one spring element (14, 14*a*), which takes effect by means of spring arms (13, 13*a*) onto the gripping arms (5, 5*a*), and tensions the gripping arms (5, 5*a*) into a closed position, wherein the spring element (14, 14*a*) or its spring arms (13, 13*a*) form spring arm ends (13.2, 13*a*.2) for contact against a control surface of an axially-movable control element or blocking element (15), which changes the spring force of the spring arms (13) or of the spring element (14), and wherein the spring arms are double-arm spring arms (13), which are held such as to pivot between their spring arm ends (13.1, 13.2), in each case about an axis co-axial with a pivot axis (6) of the associated gripping arms (5) or on a common joint bolt (6) with the associated gripping arm (5), and wherein the two gripping arms (5) are in each case mounted such as to pivot on an individual joint bolt (6), and that the joint bolts (6) are held in a common receiver (8), which, for simple assembly and dismantling of the respective container gripper (4) can be secured by latching to a transport element (3), and wherein the spring arms (13*a*) are configured with a first region or a first surface (13*a*.2.1) formed at a spring arm end (13*a*.2) for contacting against the control surface of a control element and/or blocking element (15) and with a second region or a second surface (13*a*.2.2), likewise formed at the spring arm end (13*a*.2), for taking effect on a gripping arm (5*a*), that the two regions or surfaces (13*a*.2.1, 13*a*.2.2) are provided, located opposite one another, at the spring arm end (13*a*.2), and that the spring arm end (13*a*.2) is formed as spring-elastic between these regions or surfaces (13*a*.2.1, 13*a*.2.2), and specifically by a double-walled configuration forming at least one cut-out opening (22).

16. Container gripper according to claim 15, wherein the spring arms (13) are made of a spring-elastic plastic or of a spring-elastic metal and the gripping arms (5) are made of metal.

* * * * *